US006763173B2

(12) United States Patent
Yu et al.

(10) Patent No.: US 6,763,173 B2
(45) Date of Patent: Jul. 13, 2004

(54) HERMETIC SEAL FOR OPTICAL WAVEGUIDE RIBBON FEED THROUGH

(75) Inventors: Qinrong Yu, Kanata (CA); Jean-Paul Noël, Ottawa (CA)

(73) Assignee: MetroPhotonics Inc., Ottawa (CA)

( * ) Notice: Subject to any disclaimer, the term of this patent is extended or adjusted under 35 U.S.C. 154(b) by 0 days.

(21) Appl. No.: 10/224,327

(22) Filed: Aug. 21, 2002

(65) Prior Publication Data

US 2004/0037535 A1 Feb. 26, 2004

(51) Int. Cl.[7] .................................................. G02B 6/00
(52) U.S. Cl. ...................................................... 385/138
(58) Field of Search ................................ 385/138, 139, 385/88, 89, 147

(56) References Cited

U.S. PATENT DOCUMENTS 3,615,960 A * 10/1971 Hoshii
3,755,615 A * 8/1973 Paullus et al.
4,413,881 A 11/1983 Kovats
4,699,456 A 10/1987 Mackenzie
4,779,788 A 10/1988 Rossberg
4,822,130 A 4/1989 Maranto et al.
5,376,901 A 12/1994 Chan et al.
5,568,585 A 10/1996 Kramer
5,939,672 A * 8/1999 Tang ......................... 174/50.5

* cited by examiner

*Primary Examiner*—Khiem Nguyen
(74) *Attorney, Agent, or Firm*—Freedman & Associates

(57) ABSTRACT

A technique for hermetically sealing an optical component in a metal package is described. Variations of the technique are described in which optical communication between the optical component and the outside environment is achieved with a ribbon fibre.

34 Claims, 3 Drawing Sheets

33
36
35
32

HERMETIC SEAL FOR OPTICAL WAVEGUIDE RIBBON FEED THROUGH

FIELD OF THE INVENTION

The field of the invention relates generally to hermetic sealing of optical and optoelectronic components and more specifically to the hermetic sealing of a set of optical waveguides such as a ribbon of fibres.

BACKGROUND OF THE INVENTION

The expansion of digital data traffic resulting from increased use of the Internet has led to the deployment of optical networks. These networks transmit large quantities of information very quickly however they rely on expensive optical components. In order to ensure the proper functioning of the optical components it is often necessary to isolate them from their environment. Isolating the optical component or components from moisture is very beneficial because water accelerates aging and corrosion of the optical component. Additionally, water is known to have highly detrimental effects on adhesives, which is unfortunate because adhesives are a convenient way of attaching optical components together, particularly through a light-transmitting surface. As one of skill in the art of hermetic sealing of optical components will be aware, it is important that the hermetic seal be sufficiently robust that the seal is not compromised during the working life of the product. When products are sold with twenty-year guarantees, the hermetic seal of each subcomponent is expected to last the twenty years. Generally, it is common to test each individual component for hermetic integrity. Instead, it is common practice to establish a method of hermetic sealing that is highly reliable and use spot checks to ensure that the method is working effectively. Verifying the integrity of a hermetic seal requires time and uses very costly, specialized equipment. For this reason, it is beneficial to use methods of hermetic sealing which are well established and proven in production environments.

Preventing moisture from entering a package containing an optical component is a difficult task because water molecules will penetrate microscopic cracks. A conventional optical component package is a metal box with one or more features for allowing glass waveguides to penetrate the exterior of the box. Unfortunately, it is hard to seal a metal box about a glass waveguide without leaving a crack. The prior art of Kovats U.S. Pat. No. 4,413,881, herein referred to as Kovats, teaches that a glass fibre inserted in a metal tube may be hermetically sealed to the tube by injecting a melted solderable alloy, such as BiSn in the tube, thereby plugging the tube. If the alloy expands during solidification then it will squeeze the optical fibre and help to prevent the formation of cracks between the optical fibre and the solder. It should be noted that optical fibres are generally glass and that most molten metals will not ordinarily wet to a glass surface. The Kovats prior art avoids this problem by filling a tube with molten solder while the optical fibre is in the tube. Using this method, pressure between the tube and the fibres caused by the solidification of the solder forms the hermetic seal.

While the Kovats prior art teaches a method of sealing a single fibre hermetically, it does not provide a simple means of sealing a multi-fibre array for example, a ribbon fibre, hermetically. If a ribbon of optical fibres is separated and each individual optical fibre is sealed independently then a variety of problems result. For example, the metal tubes used in forming the hermetic seal are substantially larger than the fibre. Typically these tubes are spaced approximately 0.20" (5 mm) between fibre centers. This is not a significant concern for large packages with few fibres however it is not uncommon to produce arrayed waveguide gratings (AWG) with over forty optical fibres which ideally exit the package through the same face and the spacing is typically 250 microns between adjacent fibre centers. Indeed as AWGs become more sophisticated there will be a need for even larger numbers of fibres provided at one face of an optical device to be hermetically sealed.

Alternatively, if a ribbon of fibres were sealed in a package wall according to the method of Kovats, the ribbon would likely be prone to twisting as the solder flows around it. This likely induces stress and thereby reduces the optical performance of the packaged optical component. Additionally, great care must be taken to ensure that the solder flows around all of the fibre as the fibre themselves hinder the flow of solder. Thus, when sealing a ribbon of fibre it is far more likely that voids and cracks will be present in the seal after cooling, thus compromising the hermetic performance of the seal.

Alternative methods of sealing an optical fibre are well known in the art. For example, in order to ensure that the solder wets the surface of the optical fibre it is known to metalize the fibre prior to encasing them in solder. Since the glass fibre is now encased in metal prior to being immersed in molten solder the solder easily bonds to the metalized surface of the fibre. At first glance, this solution appears highly advantageous however it has disadvantages. For example, metalizing the fibre is a slow process that typically involves a vacuum deposition machine. These machines are expensive and it is highly recommended that a skilled operator oversee them. Although many fibres can be metalized in one use of the machine, the process for metalizing fibres is very slow as only tiny amounts of metal are deposited at a given time. Consequently, if this process were to be incorporated for use with a flexible manufacturing environment then a JIT (just-in-time) manufacturing schedule would be very difficult to incorporate. Additionally, metalized optical fibres are very fragile and easily damaged in handling. Any separation of the metalized layer from the optical fibre will likely compromise the effectiveness of a hermetic seal. Alternatively, metalized optical ribbon fibre with up to eight individual waveguides are available commercially however they are very costly and their fragile nature makes shipping them very costly as well. However, large number count metalized ribbon fibre is still not available, because it is difficult to metalize so many fibre uniformly at a time. Typically, metalized ribbon fibre featuring over twelve individual waveguides is not commercially available.

It would be beneficial to provide a simple, effective method of hermetically sealing optical components that supports the sealing of a fibre array or a ribbon of fibres without inducing stress on the individual fibre. Preferably, such a method is for allowing the fibre array to be sealed hermetically without requiring costly and complex equipment. Additionally, it would be beneficial if such a method incorporated proven hermetic sealing technology and not involve preparing components in advance and storing them for later use.

SUMMARY OF INVENTION

The invention teaches the design of a junction for forming a hermetic seal about an optical waveguide, said junction comprising: a tube for providing fluid communication between a first orifice and a second orifice, a cap disposed for covering the first orifice, said cap for reducing a flow of molten metal through the first orifice when the optical waveguide is disposed within the cap, said tube being sufficiently wide to support the optical waveguide disposed between the first orifice and the second orifice while simultaneously permitting molten metal at a predetermined temperature to flow within the tube, such that, in use, the optical waveguide is disposed within the tube, molten metal is provided within the tube and flows to the cap and the molten metal solidifies, thereby forming a hermetic seal between the optical waveguide and the tube.

Further the invention describes a method of forming an optical waveguide hermetic seal comprising the steps of: disposing an optical waveguide through a cap; abutting the cap to a first orifice of a tube; providing molten metal to the tube such that the molten metal provided in a channel of the tube flows toward the first orifice of the tube; and, allowing the molten metal to solidify, thereby forming a hermetic seal between the tube and the optical waveguide.

BRIEF DESCRIPTION OF THE DRAWINGS

The invention will now be described with reference to the drawings in which.

DETAILED DESCRIPTION OF THE INVENTION

Figure 1:
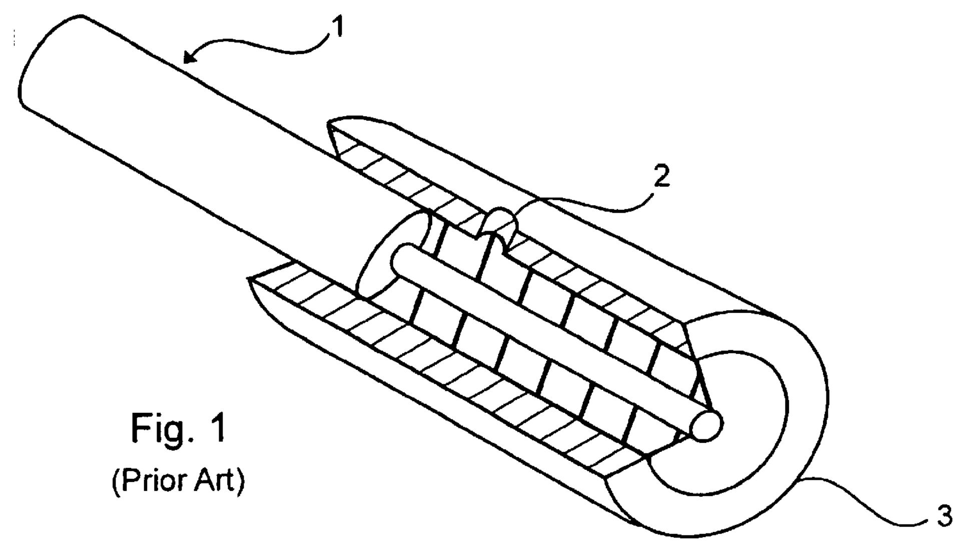
FIG. 1 is a drawing of a prior art hermetic joint.

The invention provides a method and apparatus for producing a robust hermetic seal about a ribbon of optical fibres. Referring to FIG. 1, a prior art diagram of hermetic seal produced by the hermetic sealing technique of Kovats is illustrated in a section view shown in FIG. 1. The drawing shows an optical fibre encased in solder. The fibre 1 and solder are contained within a metal tube 3 that helps to keep the solder in compression. The solder in provided to the tube via an orifice 2.

Figure 2:
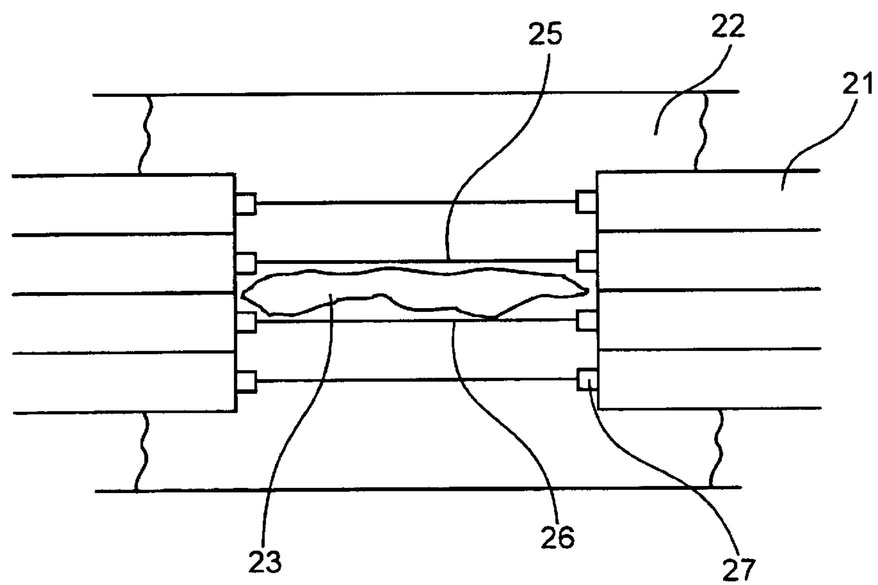
FIG. 2 is a section view of a joint with a ribbon of optical fibres in which a void has compromised the seal.

This technique is poorly suited to hermetically sealing a fibre array or ribbon for a variety of reasons. For example, in order to produce a robust hermetic seal, the optical fibre is surrounded by solder. Since glass optical fibres do not wet with most molten solders it is critical that the solder be proximate the surface of the fibres when it solidifies. FIG. 2 illustrates a ribbon of optical fibres 21 encased in solder 22. Similarly to the prior art, the sheath material 27 used to cover and bind together the individual fibre of the ribbon of optical fibres 21 has been stripped leaving an exposed region 24. Typically the sheath material is not sufficiently well bonded to the fibres to form a hermetic seal and often the sheath material is a plastic that is not hermetic. Since the ribbon of fibres is a set of fibres in close proximity, it is difficult to get the solder 22 into the correct position necessary to uniformly coat the exposed region 24 of the fibres 21. This increases the likelihood of there being voids between the optical fibres. Such a void 23 is shown proximate the fibres. This void 23 is expected to cause the adjacent fibres 25 and 26 to be pushed towards the void when the solder 22 expands. The displacement of the fibres 25 and 26 induces stress on the fibers. Additionally, in an extreme case, the fibers will kink somewhat and which leads to changes in their polarization characteristics. Additionally, it is unlikely that a void is entirely eliminated when the solder expands and therefore, the resulting joint will likely not be hermetic.

Thus, in order to produce a consistent and robust hermetic seal it is important to use a method of providing molten metal that reduces the likelihood of voids forming. Ideally, each of the optical fibres from the ribbon fibre is surrounded by molten metal in order to ensure that the fibres are not stressed. However, separating each of the fibres of the ribbon and sealing them independently is not practical.

Figure 3:
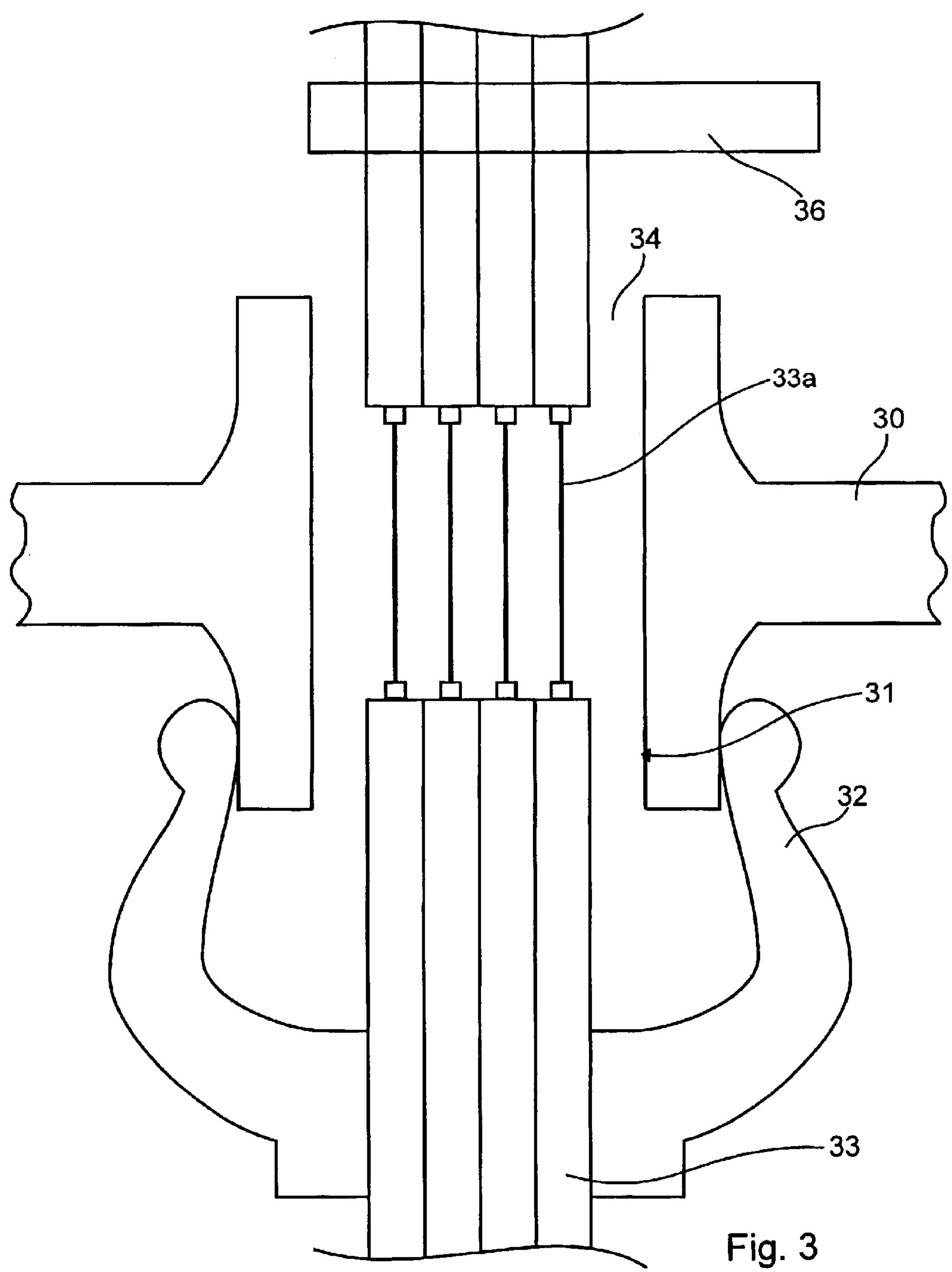
FIG. 3 is a section view of an embodiment of the invention prior to providing solder; and, FIG. 3*a* is a section view of an embodiment of the invention with molten solder surrounding the ribbon of optical fibres.

Referring to FIG. 3, a section view of a package wall with a hermetic junction suitable for accommodating ribbon of optical fibres is shown. The package 30 includes a hollow tube section 31. The tube section 31 will support the ribbon fibre and the molten solder. A cap 32 has been attached to the exterior of the tube section 31. The cap 32 has a feature for allowing a ribbon fibre 33 to penetrate the cap. The ribbon fibre 33 has been stripped of its plastic sheath in a region 33*a* contained within the tube section 31. The ribbon fibre 33 is held at one end by the cap 32 and at the other end by a jig 36. The jig 36 and the cap 32 ensure that the ribbon fibre 33 is under a slight amount of tension in the tube section 31. The cap 32 is not hermetic. The opening 34 of the tube section 31 opposite to the cap 32 remains accessible to specialized tools despite the presence of the jig 36.

Figure 3A:
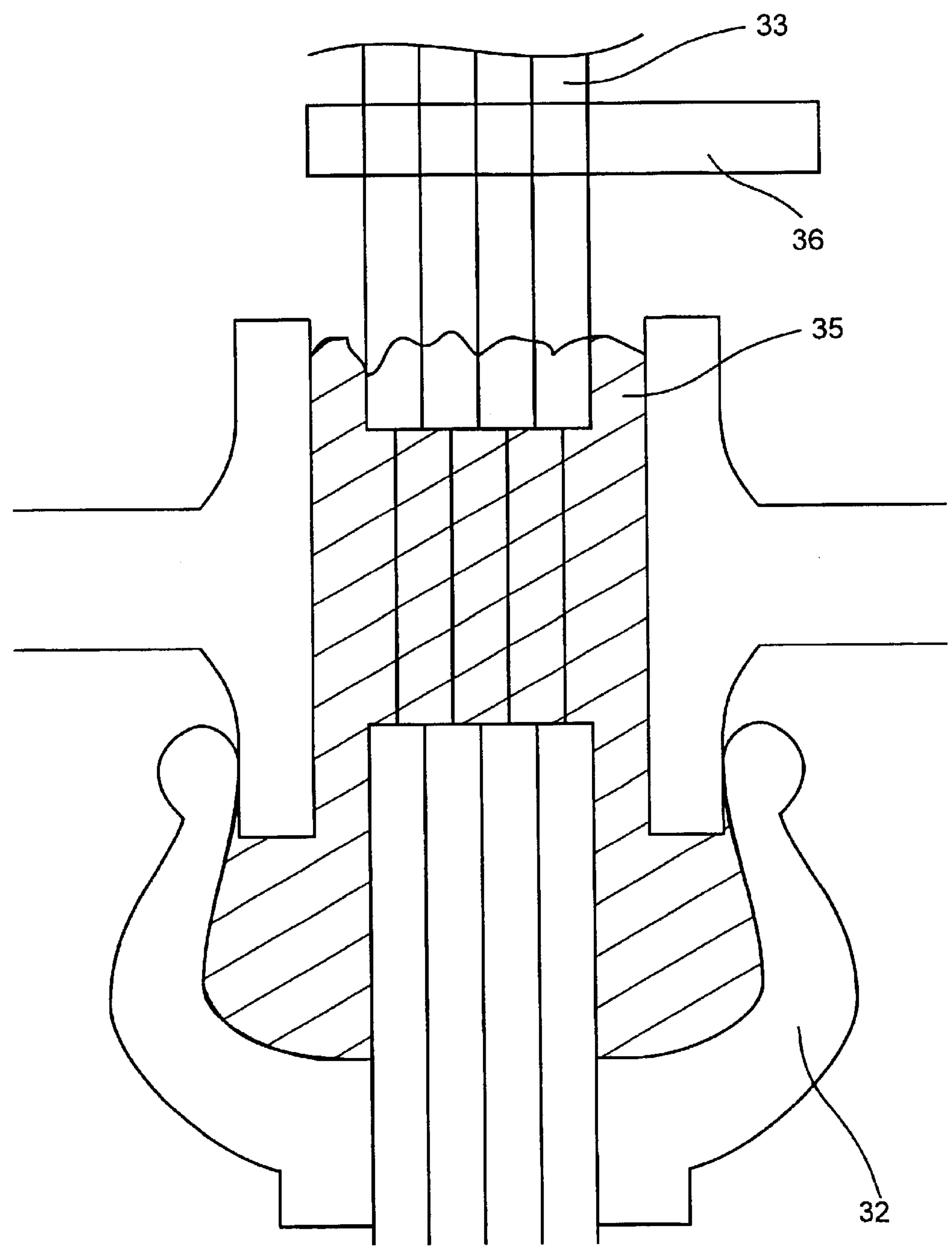

Referring to FIG. 3*a*, molten metal 35 is provided to the tube section 31 from the opening 34. The molten metal 35 flows within the tube section 31 and covers the exposed region 33*a*. The orientation of the tube section 31 with the cap 32 down helps to bias any air pockets up and out of the molten metal 35. The cap 32 reduces the amount of molten metal draining out the bottom of the tube section. Since the ribbon fibre 33 is held under tension between the jig 36 and the cap 32 the ribbon fibre 33 resists being pushed against the side of the tube section 31, thus ensuring that the ribbon fibre 33 is not displaced when the molten solder expands during solidification.

Additionally, the use of the said design permits the use of solders absent flux. As one of skill in the art will be aware, the use of acidic flux is cause for concern because even a mild acid will have a detrimental effect on a hermetic joint. Additionally, many optical components, such as InP based integrated circuits and MEMS (Micro Electro Mechanical System) devices, are very sensitive to contamination from flux therefore eliminating flux eliminates failure due to flux contamination during sealing.

Clearly, the diameter of the tube section 31 is chosen to be sufficiently large for accommodating the ribbon fibre 33 as well as the flowing solder 35. Providing sufficient space for the solder to flow within the tube section and around the ribbon fibre 33 helps to provide a consistent process. If the solder 35 should push the ribbon fibre 33 to one side of the tube section 31 the slight tension provided to the ribbon fibre 33 from the cap 32 and jig 36 cause the ribbon fibre to return to an area proximate the center of the tube section 31 and away from the walls. This helps to prevent the formation of voids between any of the individual fibres and the tube section 31. Thus, the solder is able to wet a complete diameter of the tube section 31 and the fibres of the ribbon fibre 33 remain substantially straight relative to the tube section 31. The molten solder 35 expands slightly on solidification and thus it exerts pressure on the package and the optical fibres. This pressure helps to ensure that no cracks form.

Once the molten solder has solidified and cooled, the cap 32 is optionally removed to visually inspect the hermetic joint. Alternatively, the cap 32 is made from a flexible material capable of resisting high temperature failure and is used as a strain relief for the fibres exiting the tube section. Since most hermetically sealed optical fibres require a strain relief the addition of the cap does not substantially increase costs of manufacturing. Although, this embodiment clearly incorporates a ribbon of optical fibres, an alternative embodiment of the invention hermetically seals a single optical fibre. Clearly, the cross section of the ribbon fibre or single fibre determines the appropriate tube shape. While this simplifies the process and helps to ensure that a good hermetic seal results, alternative embodiments exist. For example, if the material of the tube section has a higher coefficient of thermal expansion than the solidified solder it is apparent to one of skill in the art of mechanical design that the tube section squeezes the solder as it cools thereby enhancing the seal it creates. Provided the correct amount of cooling and the correct thermal expansion characteristics of the various components, a robust hermetic seal is produced.

In an alternative embodiment of the invention, the package is provided to allow the ribbon of optical fibres to be held horizontally. In this embodiment, separate caps are used at each end of the tube section and the molten solder is provided from a small orifice in fluid communication with the tube section.

In yet another embodiment, the material for the cap is not held firmly to the package but merely held in proximity to the package by a second jig. When the solder has solidified, the second jig is removed. Alternatively, no cap is incorporated and the second jig acts as a cap. In this case the second jig has a plugging region for reducing the flow of solder out the end of the tube section. This plugging region has a surface that substantially prevents bonding to the solder.

In yet another alternative embodiment of the invention, the tube section is designed to accommodate more than one ribbon of optical fibres. This will allow an even larger number of optical waveguides to penetrate the package. However, it is recommended that the cap and tube geometry be redesigned for different combinations of ribbon fibre in order to produce a hermetic joint according to the invention.

It will be apparent to one of skill in the art of mechanical design and hermetic sealing that numerous other embodiments of the invention may be envisioned without departing from the spirit and the scope of the invention.

What is claimed is:

1. A junction for forming a hermetic seal about an optical waveguide, said junction comprising:

a tube for providing fluid communication between a first orifice and a second orifice, a cap disposed for covering the first orifice, said cap for reducing a flow of molten metal through the first orifice when the optical waveguide is disposed within the cap, said tube being sufficiently wide to support the optical waveguide disposed between the first orifice and the second orifice while simultaneously permitting molten metal at a predetermined temperature to flow within the tube, such that, in use, the optical waveguide is disposed within the tube, molten metal is provided within the tube and flows to the cap and the molten metal solidifies, thereby forming a hermetic seal between the optical waveguide and the tube.

2. A junction according to claim 1, wherein the cap has a supporting feature for receiving the optical waveguide, and when supporting the optical waveguide, the cap positions the optical waveguide proximate a center of the first orifice.

3. A junction according to claim 2, wherein the optical waveguide is a ribbon of optical waveguides.

4. A junction according to claim 2, wherein the tube is straight and has a consistent cross sectional area.

5. A junction according to claim 4, wherein the cap is for supporting the optical waveguide with strength sufficient for holding the waveguide in tension such that the waveguide is held substantially in the center of the tube, in a state of tension while molten metal solidifies within the tube.

6. A junction according to claim 1, wherein the cap is held in position using an adhesive.

7. A junction according to claim 2, wherein the opening of the cap is sized to substantially prevent the flow of molten metal therethrough when the optical waveguide is disposed therein.

8. A junction according to claim 3, wherein the tube is sized to accommodate the waveguides and permit the flow of molten metal thereabout.

9. A junction according to claim 1, wherein the cap is resilient to a temperature at which the molten metal remains molten.

10. A junction according to claim 1, comprising a package for containing an optical component, said tube being integral therewith.

11. A junction according to claim 10, wherein the first orifice is proximate an interior of the package.

12. A junction according to claim 1, wherein when the molten metal solidifies it bonds to the cap.

13. A junction for forming a hermetic seal about an optical waveguide, said junction comprising:

a tube for providing fluid communication between a first orifice and a second orifice, said first orifice for being covered by a cap, said cap for reducing a flow of molten metal through the first orifice, said tube being sufficiently wide to support the optical waveguide disposed between the first orifice and the second orifice while simultaneously permitting molten metal at a predetermined temperature to flow within the tube;

such that, in use, the optical waveguide is disposed within the tube, a cap is disposed proximate the first orifice, molten metal is provided within the tube and flows to the cap and the molten metal solidifies, thereby forming a hermetic seal between the optical waveguide and the tube.

14. A junction according to claim 13, wherein the tube is sufficiently wide to support a ribbon of optical fibres.

15. A junction according to claim 14, wherein the tube is sized to accommodate the waveguides and permit the flow of molten metal thereabout.

16. A junction according to claim 13, wherein the tube is straight and has a consistent cross sectional area.

17. A junction according to claim 13, comprising a package for containing an optical component, said tube being integral therewith.

18. A junction according to claim 17, wherein the first orifice is proximate an interior of the package.

19. A method of forming an optical waveguide hermetic seal comprising the steps of:

disposing an optical waveguide through a cap;

abutting the cap to a first orifice of a tube;

providing molten metal to the tube such that the molten metal provided in a channel of the tube flows toward the first orifice of the tube; and, allowing the molten metal to solidify, thereby forming a hermetic seal between the tube and the optical waveguide.

20. A method of forming an optical waveguide hermetic seal according to claim 19, comprising the step of: biasing the molten metal to flow towards the first orifice of the tube.

21. A method of forming an optical waveguide hermetic seal according to claim 19, wherein the step of abutting the cap to the first orifice of a tube comprises the step of using an adhesive for bonding the cap to the first orifice of the tube.

22. A method of forming an optical waveguide hermetic seal according to claim 19, wherein the optical waveguide is one of a waveguide array and ribbon of optical fibres supporting at least four optical waveguides.

23. A method of forming an optical waveguide hermetic seal according to claim 22, wherein the one of a waveguide array and ribbon of optical fibres is stripped to expose a cladding layer of each optical waveguide.

24. A method of forming an optical waveguide hermetic seal according to claim 22, wherein the fibres in the one of a waveguide array and ribbon of optical fibres are spaced within the tube to provide molten metal flow thereabout and therebetween proximate the cladding layer of each optical waveguide.

25. A method of forming an optical fibre hermetic seal according to claim 24, comprising the step of securing the one of a waveguide array and ribbon of optical fibres to a jig prior to the step of allowing the molten metal to solidify, wherein the jig biases each optical waveguide of the one of a waveguide array and ribbon of optical fibres to position the each of the optical waveguides to facilitate a flow of molten metal thereabout and therebetween.

26. A method of forming an optical fibre hermetic seal according to claim 24, comprising the step of securing the one of a waveguide array and ribbon of optical fibres to a jig prior to the step of allowing the molten metal to solidify, wherein the jig biases each optical waveguide of the one of a waveguide array and ribbon of optical fibres to a center of the tube.

27. A method of forming an optical fibre hermetic seal according to claim 19, wherein the step of providing molten metal to the tube comprises the step of providing molten metal through a second orifice of the tube.

28. A method according to claim 27, wherein the molten metal is a fusable alloy.

29. A method of forming an optical fibre hermetic seal according to claim 19, wherein the cap has a sleeve feature and the step of abutting the cap to a first orifice of the tube includes disposing the sleeve feature within the tube.

30. A method of forming an optical fibre hermetic seal according to claim 19, comprising the step of securing the optical waveguide to a jig prior to the step of allowing the molten metal to solidify, wherein the jig biases the waveguide to a center of the tube.

31. A method of forming an optical fibre hermetic seal according to claim 19, wherein the tube is integral with a package for containing an optical component.

32. A method of forming an optical fibre hermetic seal according to claim 31, wherein when the step of abutting the cap to the first orifice is performed the cap is proximate an interior of the package.

33. A method of forming an optical fibre hermetic seal according to claim 19, wherein the opening of the cap is sized to substantially prevent the flow of molten metal therethrough when optical waveguides extend therethrough.

34. A method of forming an optical fibre hermetic seal according to claim 19, wherein during the step of allowing the molten metal to solidify the molten metal bonds to the cap.

* * * * *